United States Patent
Au (10) Patent No.: US 12,531,338 B2
(45) Date of Patent: Jan. 20, 2026

(54) REFLECTOR ARRAY FOR NON-LINE-OF-SIGHT COVERAGE

(71) Applicant: T-MOBILE INNOVATIONS LLC, Overland Park, KS (US)

(72) Inventor: Chad Chun Fai Au, Kirkland, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 47 days.

(21) Appl. No.: 18/759,196

(22) Filed: Jun. 28, 2024

(65) Prior Publication Data
US 2026/0005435 A1 Jan. 1, 2026

(51) Int. Cl.
*H01Q 3/46* (2006.01)
*H04B 7/04* (2017.01)

(52) U.S. Cl.
CPC ............ *H01Q 3/46* (2013.01); *H04B 7/04013* (2023.05)

(58) Field of Classification Search
CPC .............................. H01Q 3/46; H04B 7/04013
See application file for complete search history.

(56) References Cited

U.S. PATENT DOCUMENTS

| | | | |
|---|---|---|---|
| 11,005,581 B1 * | 5/2021 | Gomadam | H04B 17/12 |
| 2020/0321697 A1 * | 10/2020 | Zimmerman | H01Q 21/26 |
| 2024/0421477 A1 * | 12/2024 | Kim | H01Q 3/2647 |

FOREIGN PATENT DOCUMENTS

CN 111106858 A * 5/2020 ............ H04B 7/0404

OTHER PUBLICATIONS

Liao et al. ("Linear Retro-Beam Scanning Array System", IEEE Transactions on Antennas and Propagation, vol. 67, No. 8, Aug. 2019) (Year: 2019).*
Wolff, Christian, "Van Atta Reflector Array", Available online at https://www.radartutorial.eu/17.bauteile/bt46.en.html, accessed on Jul. 9, 2024, 1 page.
Everything RF, "What are Reconfigurable Intelligent Surfaces?", Available online at https://www.everythingrf.com/community/what-are-reconfigurable-intelligent-surfaces, accessed on Jul. 9, 2024, 4 pages.

* cited by examiner

*Primary Examiner* — Seung H Lee
(74) *Attorney, Agent, or Firm* — Shook, Hardy & Bacon L.L.P.

(57) ABSTRACT

Aspects provided herein provide methods and systems for utilizing an adaptable Van Atta reflective array (A-VARA) system. The system comprises an A-VARA panel comprising variable phase shifters incorporated into transmission lines linking a set of radiating elements. The system also comprises a control that modifies a reflection direction of the A-VARA panel and provides aggregate adjustment to each of the variable phase shifters to steer reflected coverage around an obstacle.

20 Claims, 5 Drawing Sheets

REFLECTOR ARRAY FOR NON-LINE-OF-SIGHT COVERAGE

BACKGROUND

In urban or undulating terrain environments, there are commonly localized areas shadowed by obstacles to radio frequency (RF) propagation where no wireless coverage exits. This is particularly true for network layers operating on high frequency bands (FR2 or 6 GHz or higher), namely millimeter wave (mmWave) frequencies. RF repeaters are not viable due to deployment and operating costs, as well as a lack of connectivity to the equipment for remote management.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods, apparatus, and systems are provided for utilizing an adaptable Van Atta reflective array (A-VARA) system. The system comprises an A-VARA panel comprising variable phase shifters incorporated into transmission lines linking a set of radiating elements. The system also comprises a control that modifies a reflection direction of the A-VARA panel and provides aggregate adjustment to each of the variable phase shifters to steer reflected coverage around an obstacle.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
ML Machine Learning
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Signal Receive Power
RSRQ Reference Signal Receive Quality
RSSI Received Signal Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, $32^{nd}$ Edition (2022).

By way of background, a traditional telecommunications network employs a plurality of base stations (i.e., access point, node, cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols.

A base station may comprise one access point or more than one access point. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an eNodeB). In this regard, typically only one active uplink connection can occur per frequency. The base station may include one or more sectors served by individual transmitting/receiving components associated with the base station (e.g., antenna arrays controlled by an eNodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service.

The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network.

For an illustrative example, a UE can include cell phones, smartphones, tablets, laptops, small cell network devices (such as micro cell, pico cell, femto cell, customer premises equipment (CPE) for fixed wireless access, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point. A UE may be, in an embodiment, similar to device 500 described herein with respect to FIG. 5.

In conventional cellular communications technology, wireless high speed internet service is offered by mobile network operators as an alternative to the traditional cable or fiber-to-the-premises (FTTP) internet service providers (ISPs). However, it is not uncommon, particularly in an urban environment, where the topography includes numerous incidences such that RF propagation is obstructed, resulting in gaps or shadows in coverage. This is increasingly challenging for high frequency bands (e.g., FR2 or 6 GHz or higher) and particularly true for the mmWave spectrum.

A common approach to extending coverage is with RF repeaters. Generally, RF repeaters are active devices (i.e., power must be supplied) consisting of signal amplifiers and a pair of directional antennas. The donor antenna is directed to the cell site from which the coverage originates and the coverage antenna is directed to where the in-fill coverage is desired. The donor and coverage antennas must be sufficiently electrically isolated from each other to avoid feedback (so the repeated and amplified signal do not get coupled back into the repeater and overwhelm it). Such an arrangement of the antennas is usually a non-issue for a repeater that is used to extend the coverage radius of the serving cell, where the antennas typically align with the direction of propagation (i.e., they are pointed 180 degrees away from each other).

However, for urban applications where coverage can benefit from going around the corner of obstructing buildings, maintaining sufficient electrical isolation between the donor and coverage antennas can be challenging since the angular difference between them can be 90 degrees or less. Another challenge is the repeater must have electrical power to operate. Therefore, power must be routed to the preferred repeater mounting location if none currently exists. Repeaters also contain active electronics, which are prone to fail over time. With no connectivity for remote monitoring and management, a malfunctioning repeater leaves customers without service, at best, or creates interference, at worst, without the operator knowing.

The present disclosure is directed to a reflector array for non-line-of-sight service. A typical phased array antenna comprises a series of radiating elements arranged in a row with periodic spacing. Duplicate copies of a 1D linear arrays can be applied to form a 2D array. The corporate feed divides/combines the power to/from each element so that the elements work in concert to form a beam in the desired direction. Moreover, the beam can be steered in directions across the plane formed by the array elements. Such an array antenna can be fed by a transceiver to create a radio system, with which data modulated onto a carrier may be transmitted and received wirelessly for a band of frequencies.

Similarly, a Van Atta reflective array (VARA) comprises a set of radiating elements with periodic spacing. In some aspects, the transmission lines behind certain elements are electrically shorted and phased such that any plane wave impinging upon the array aperture is reflected, either in the same direction from which the signal originates, or at an alternative fixed direction with the same focused beam as when the signal is emitted from a phased array antenna aperture. This is in contrast to an ordinary metallic surface where the reflected wave would continue to propagate outward from the surface spherically.

In some aspects, the VARA design is a passive device and requires no electrical power to operate. Moreover, in these aspects, the VARA design is highly reliable since there are few components to fail. In other aspects, the VARA design incorporates amplifiers so that the reflected signal is boosted in power density.

In some cases, the angle of directional change needed to deliver wireless service to any particular use case is undefined. Rather than providing a static reflection angle, variable phase shifters can be incorporated into the transmission lines linking the radiating elements to steer the reflected coverage in the desired direction to create an adaptable VARA (A-VARA).

Once the A-VARA panel is mounted at a strategic location for facilitating reflected coverage, the panel's reference direction is aligned with the best serving cell site via a planning tool that informs the coverage layout or, if the cell site or some other reference point is in visual range, using a simple scope. The desired direction for the reflected coverage is known and relatively near to the A-VARA and can be read on the scope direction scale. Once determined, the A-VARA reflection direction can be adjusted with a manual control knob on the back of the panel, which provides an aggregate adjustment to all the variable phase shifters. In aspects, the A-VARA is designed for single band or multi-band operation, with separate adjustment knobs. Moreover, the A-VARA panel can be utilized for any wireless services including fixed wireless access, low band, mid band, and/or high band.

In a first aspect of the present invention, a method of utilizing an adaptable Van Atta reflective array (A-VARA) panel is provided. The method comprises mounting the A-VARA panel comprising variable phase shifters incorporated into transmission lines linking a set of radiating elements. The method also comprises modifying a reflection direction of the A-VARA panel utilizing a control that provides aggregate adjustment to each of the variable phase shifters to steer reflected coverage around an obstacle.

A second aspect of the present disclosure is directed to a method of utilizing an adaptable Van Atta reflective array (A-VARA) panel. The method comprises mounting the A-VARA panel comprising variable phase shifters incorporated into transmission lines linking a set of radiating elements. The method also comprises aligning a reference direction of the A-VARA panel using a scope or a planning tool to steer reflected coverage around an obstacle.

Another aspect of the present disclosure is directed to an adaptable Van Atta reflective array (A-VARA) system. The system comprises an A-VARA panel comprising variable phase shifters incorporated into transmission lines linking a set of radiating elements. The system also comprises a control that modifies a reflection direction of the A-VARA panel and provides an aggregate adjustment to each of the variable phase shifters to steer reflected coverage around an obstacle.

Figure 1:
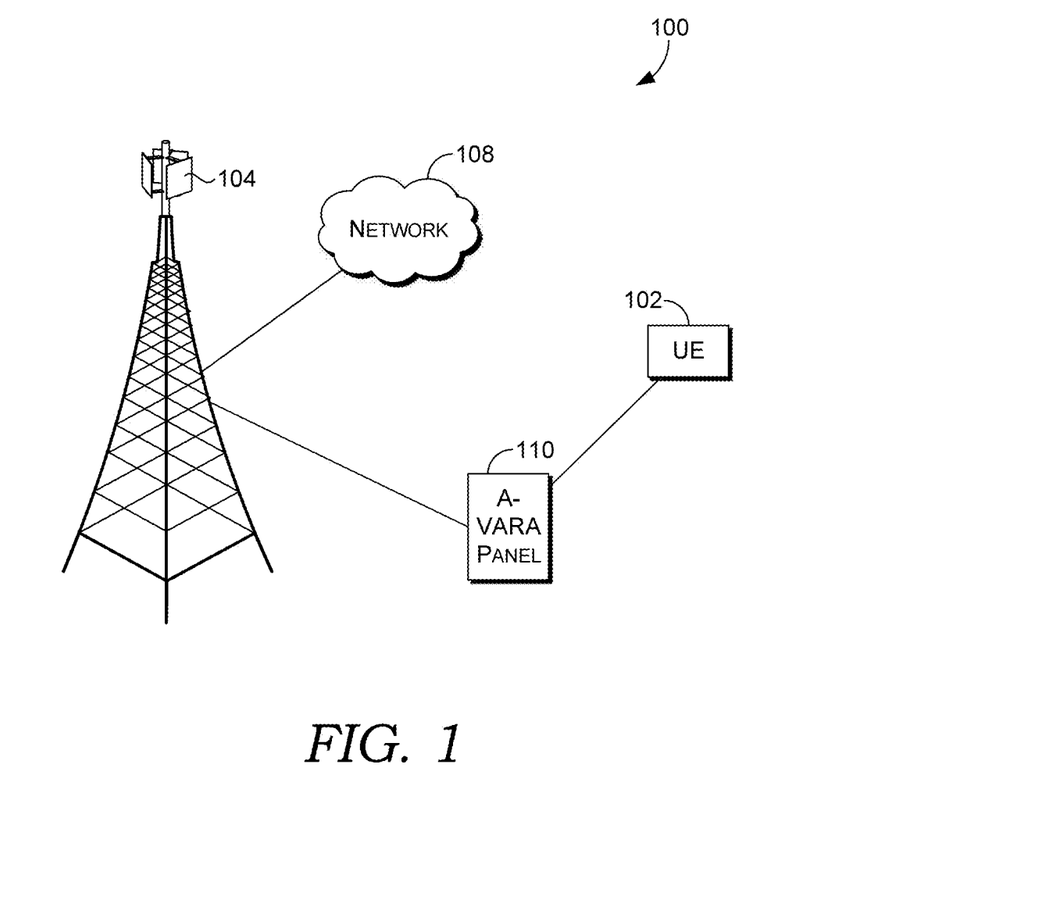
FIG. 1 depicts a diagram of an exemplary network environment in which implementations of the present disclosure may be employed, in accordance with aspects herein.

FIG. 1 provides an exemplary network environment in which implementations of the present disclosure may be employed. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 includes user device 102, a first node 104, and network 108. In network environment 100, the user device 102 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that wirelessly communicates via with a node of the wireless network, such as the first node 104, in order to interact with one or more components of the network 108.

Figure 5:
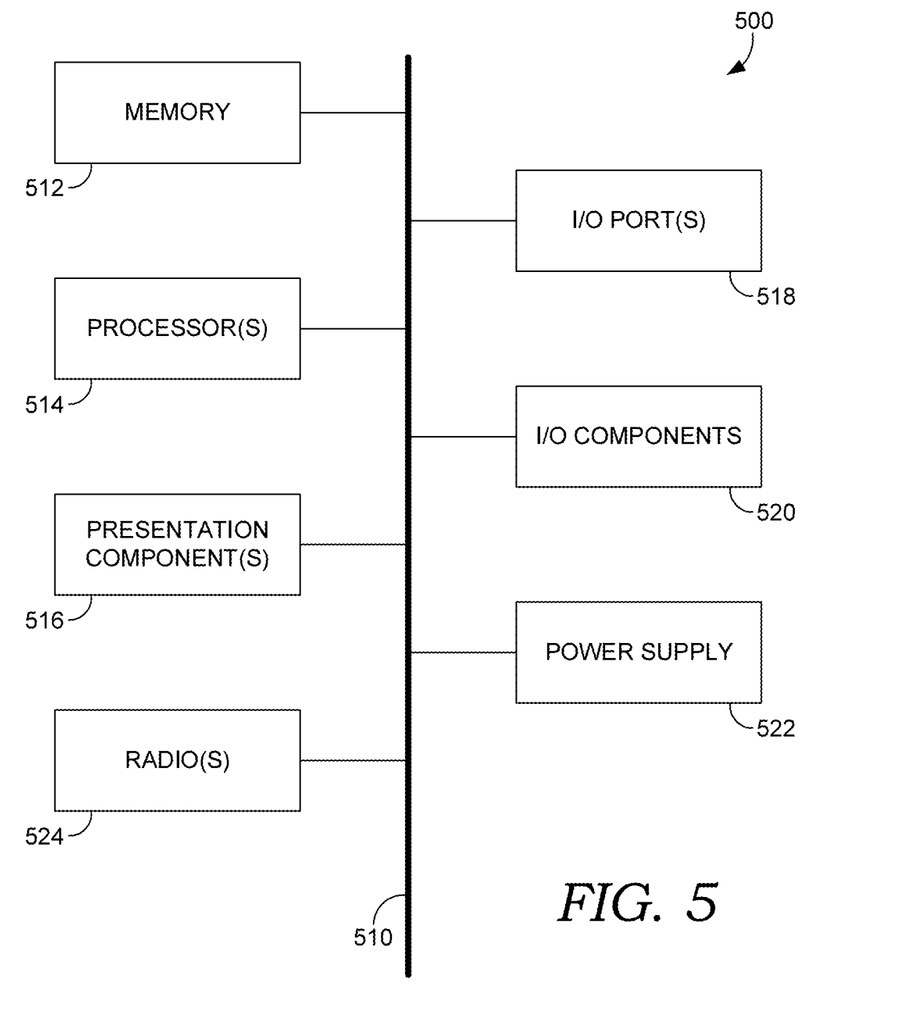
FIG. 5 depicts an exemplary computing device suitable for use in implementations of the present disclosure, in accordance with aspects herein.

In some aspects, the user device 102 can correspond to computing device 500 in FIG. 5. Thus, a user device can include, for example, a display(s), a power source(s) (e.g., a battery), a data store(s), a speaker(s), memory, a buffer(s), a radio(s) and the like. In some implementations, the user device 102 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network. Further, the user device 102 may communicate with the node 104 on any one or more frequencies, frequency bands, channels, or the like. Though only the node 104 is depicted in FIG. 1, it should be understood that the user device 102 may be capable of connecting to any one or more of a plurality of nodes, using any one or more of a plurality of communication protocols, on any one or more of a plurality of frequencies.

In some cases, the user device 102 in network environment 100 can optionally utilize network 108 to communicate with other computing devices (e.g., a mobile device(s), a server(s), a personal computer(s), etc.) through the node 104. The network 108 may be a telecommunications network(s), or a portion thereof. A telecommunications network might include an array of devices or components (e.g., one or more base stations, servers, computer processing components), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network 108 can include multiple networks, as well as being a network of networks, but is shown in more simple form so as to not obscure other aspects of the present disclosure.

Network 108 can be part of a telecommunication network that connects subscribers to their immediate service provider. In some instances, network 108 can be associated with a telecommunications provider that provides services (e.g., voice, data, SMS) to user devices, such as user device 102. For example, network 108 may provide voice, SMS, and/or data services to user devices or corresponding users that are registered or subscribed to utilize the services provided by a telecommunications provider. Network 108 can comprise any one or more communication networks providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, the first node 104 is configured to communicate with user devices, such as the user device 102 that are located within the geographical area, or cell, covered by the one or more antennas of the first node 104. Said area may be referred to herein as a geographic coverage area, sector, or the like. Though referred to as a node for simplicity, the first node 104 may include (or be communicatively coupled to) one or more base stations, nodes, base transmitter stations, radios, antennas, antenna arrays, power amplifiers, transmitters/receivers, digital signal processors, control electronics, GPS equipment, and the like. In some aspects, network environment 100 includes at least one adaptable Van Atta reflective array (A-VARA) panel 110, enabling UE 102 to receive coverage by the one or more antennas of the first node 104.

Figure 2:
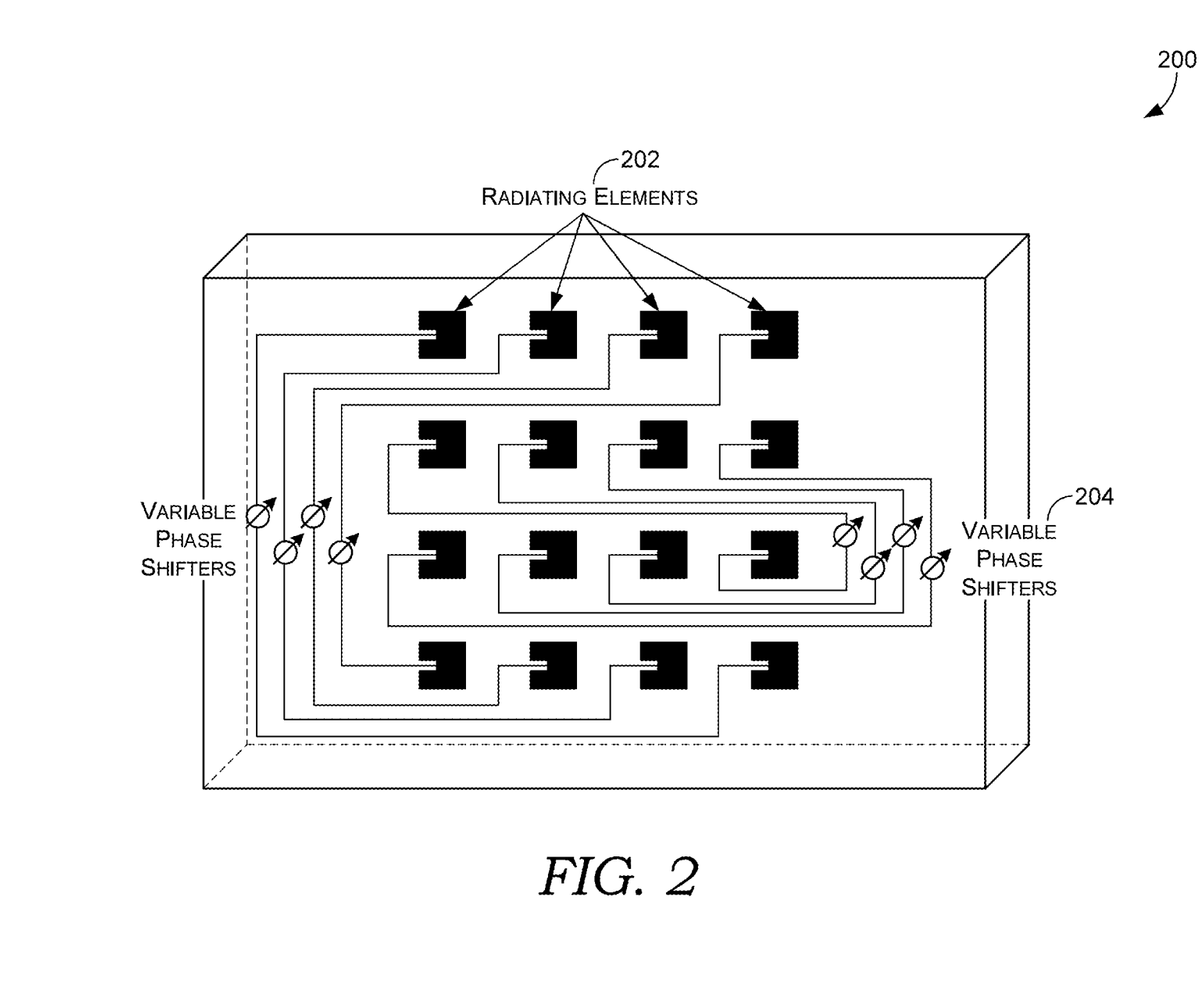
FIG. 2 depicts a diagram of an exemplary adaptable Van Atta reflective array (A-VARA) panel, suitable for use in a network environment, in accordance with aspects herein.

In FIG. 2, a diagram of an exemplary A-VARA panel 200, suitable for use in a network environment, in accordance with aspects herein, is illustrated. As shown, the A-VARA panel 200 comprises a set of radiating elements 202 with periodic spacing. Variable phase shifters 204 are incorporated into the transmission lines linking the radiating elements to steer the reflected coverage in the desired direction to create the A-VARA panel 200.

Figure 3:
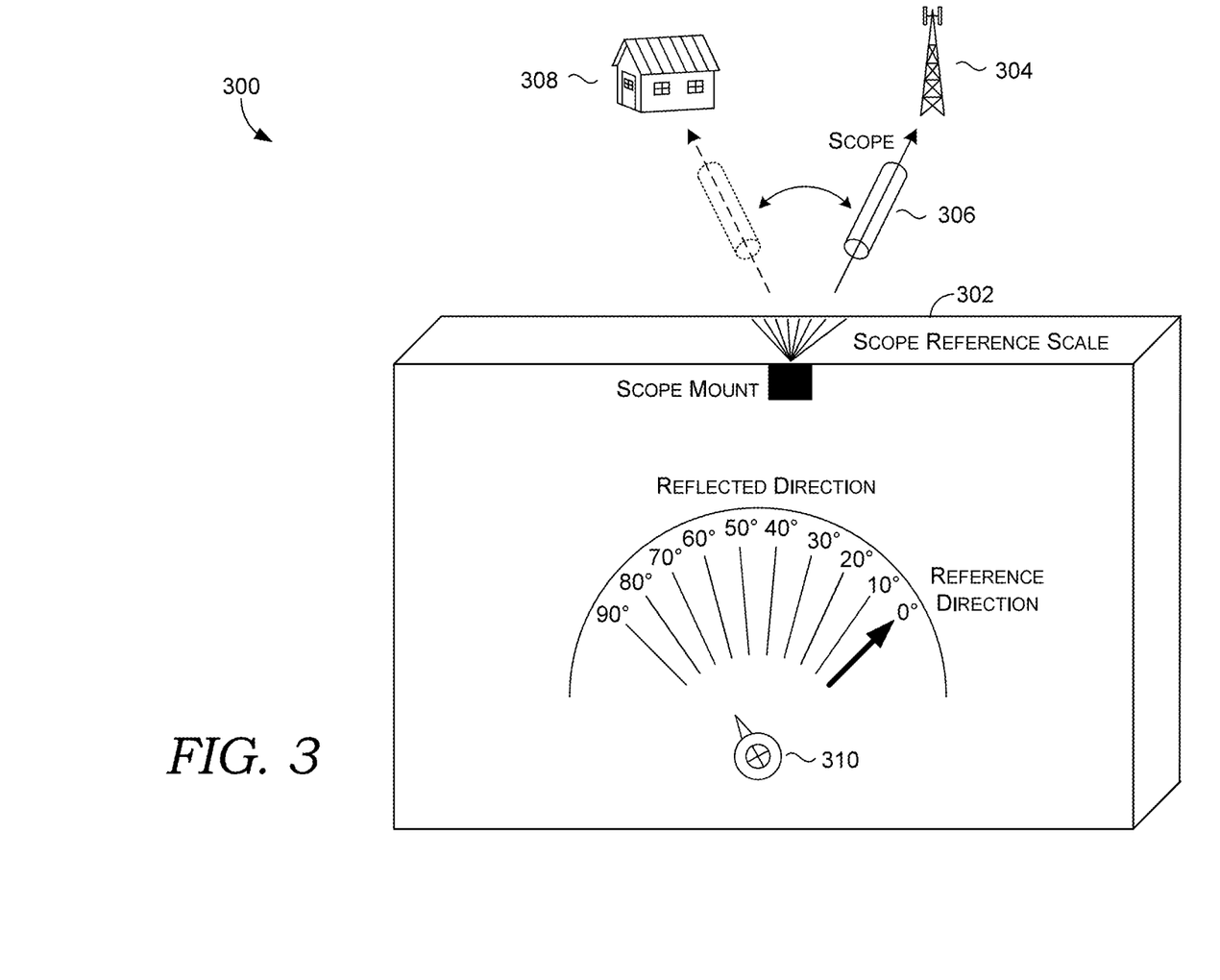
FIG. 3 depicts a diagram of an exemplary adaptable Van Atta reflective array (A-VARA) system, suitable for use in a network environment, in accordance with aspects herein.

FIG. 3 depicts a diagram of an exemplary adaptable Van Atta reflective array (A-VARA) system 300, suitable for use in a network environment, in accordance with aspects herein. As shown, the A-VARA panel 302 is mounted at a strategic location for facilitating reflected coverage, the setup process may involve aligning the panel's reference direction with the best serving cell site 304. For example, a planning tool may be utilized that informs the coverage layout. In another example, the cell site 304 or some other reference point may be in visual range using a simple scope 306 mounted to the A-VARA panel 302.

The desired direction for the reflected coverage should be known and relatively near to the A-VARA (such as house 308). This can also be determined using the simple scope 306. Once determined, the A-VARA reflection direction can be adjusted with a manual control knob 310 on the back of the panel 302, which provides an aggregate adjustment to all the variable phase shifters.

Figure 4:
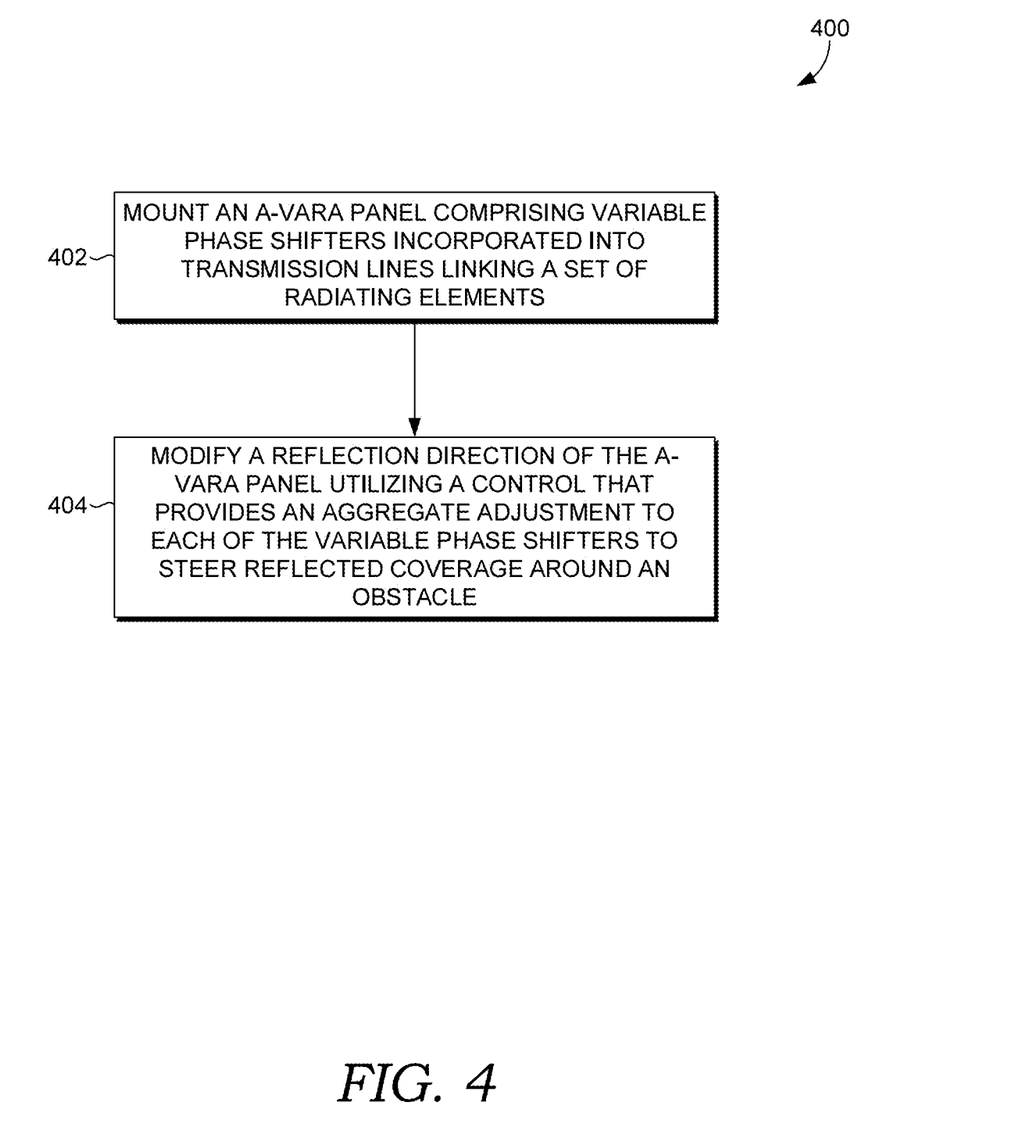
FIG. 4 is a flow diagram of an exemplary method for utilizing an A-VARA system, in accordance with aspects herein.

FIG. 4 is a flow diagram of an exemplary method for utilizing an A-VARA panel, in accordance with aspects herein. The method 400 begins with mounting, at step 402, the A-VARA panel comprising variable phase shifters incorporated into transmission lines linking a set of radiating elements. In some aspects, a reference direction of the A-VARA panel is aligned using a scope. Additionally or alternatively, a reference direction of the A-VARA panel is aligned using a planning tool that informs a coverage layout.

The method 400 also comprises modifying, at step 404, a reflection direction of the A-VARA panel utilizing a control that provides aggregate adjustment to each of the variable phase shifters to steer reflected coverage around an obstacle. The A-VARA panel may be utilized for single band operation or multi-band operation. In aspects, the control comprises a first adjustment knob for single band operation and a second adjustment knob for multi-band operation. The A-VARA panel may provide fixed wireless access services, low band services, mid band services, and/or high band services.

In some aspects, the A-VARA panel comprises amplifiers to boost a reflected signal in power density. In other aspects, the A-VARA panel does not require electrical power to operate.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the aspects described herein, and nor should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 510 that directly or indirectly couples the following devices: memory 512, one or more processors 514, one or more presentation components 516, input/output (I/O) ports 518, I/O components 520, power supply 522, and radio 524. Bus 510 represents what may be one or more buses (such as an address bus, data bus, or combination thereof). The devices of FIG. 5 are shown with lines for the sake of clarity. However, it should be understood that the functions performed by one or more components of the computing device 500 may be combined or distributed amongst the various components. For example, a presentation component such as a display device may be one of I/O components 520. The processors 514 of computing device 500 may include a memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules, or other data.

Computer storage media includes non-transient RAM, ROM, EEPROM, flash memory or other memory technology, CD-ROM, digital versatile disks (DVDs) or other optical disk storage, magnetic cassettes, magnetic tape, magnetic disk storage, or other magnetic storage devices. Computer storage media and computer-readable media do not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or non-volatile memory. Memory 512 may be removable, non-removable, or a combination thereof. Exemplary memory includes solid-state memory, hard drives, optical-disc drives, etc. Computing device 500 includes one or more processors 514 that read data from various entities such as bus 510, memory 512, or I/O components 520. One or more presentation components 516 presents data indications to a person or other device. Exemplary one or more presentation components 516 include a display device, speaker, printing component, vibrating component, etc. I/O ports 518 allow computing device 500 to be logically coupled to other devices including I/O components 520, some of which may be built into computing device 500. Illustrative I/O components 520 include a microphone, joystick, game pad, satellite dish, scanner, printer, wireless device, etc.

Radio(s) 524 represents a radio that facilitates communication with a wireless telecommunications network. Illustrative wireless telecommunications technologies include CDMA, GPRS, TDMA, GSM, and the like. Radio(s) 524 may additionally or alternatively facilitate other types of wireless communications including Wi-Fi, WiMAX, LTE, and/or other VOIP communications. In some aspects, radio(s) 524 may support multimodal connections that include a combination of 3GPP radio technologies (e.g., 4G, 5G, and/or 6G) and/or non-3GPP radio technologies. As can be appreciated, in various aspects, radio(s) 524 can be configured to support multiple technologies and/or multiple radios can be utilized to support multiple technologies. In some aspects, the radio(s) 524 may support communicating with an access network comprising a terrestrial wireless communications base station and/or a space-based access network (e.g., an access network comprising a space-based wireless communications base station). A wireless telecommunications network might include an array of devices, which are not shown so as to not obscure more relevant aspects of the aspects described herein. Components such as a base station, a communications tower, or even access points (as well as other components) can provide wireless connectivity in some aspects.

In various alternative aspects, system and/or device elements, method steps, or example implementations described throughout this disclosure may be implemented at least in part using one or more computer systems, field-programmable gate arrays (FPGAs), application-specific integrated circuits (ASICs), or similar devices comprising a processor coupled to a memory and executing code to realize that elements, processes, or examples, said code stored on a non-transient hardware data storage device. Therefore, other aspects of the present disclosure may include elements comprising program instructions resident on computer-readable media that when implemented by such computer systems, enable them to implement the aspects described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read-only memory (ROM), non-volatile ROM, programmable ROM (PROM), erasable-programmable ROM (E-PROM), random-access memory (RAM), or any other form of permanent, semi-permanent, or temporary memory storage system of a device having a physical, tangible form. Program instructions include, but are not limited to, computer-executable instructions executed by computer system processors and hardware description languages such as Verilog or Very High Speed Integrated Circuit (VHSIC) Hardware Description Language (VHDL).

Many different arrangements of the various components depicted, as well as components not shown, are possible without departing from the scope of the claims below. Aspects in this disclosure are described with the intent to be illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings, which form a part hereof wherein like numerals designate like parts throughout, and in which is shown, by way of illustration, aspects that may be practiced. It is to be understood that other aspects may be utilized and structural or logical changes may be made without departing from the scope of the present disclosure. Therefore, the preceding detailed description is not to be taken in the limiting sense, and the scope of aspects is defined by the appended claims and their equivalents.

The invention claimed is:

1. A method of utilizing an adaptable Van Atta reflective array (A-VARA) panel, the method comprising:
   mounting the A-VARA panel comprising variable phase shifters incorporated into transmission lines linking a set of radiating elements; and
   modifying a reflection direction of the A-VARA panel utilizing a control that provides an aggregate adjustment to each of the variable phase shifters to steer reflected coverage around an obstacle.

2. The method of claim 1, further comprising aligning a reference direction of the A-VARA panel using a scope.

3. The method of claim 1, further comprising aligning a reference direction of the A-VARA panel using a planning tool.

4. The method of claim 1, wherein the A-VARA system is utilized for single band operation or multi-band operation.

5. The method of claim 4, wherein the control comprises a first adjustment knob for single band operation and a second adjustment knob for multi-band operation.

6. The method of claim 1, wherein the A-VARA system provides fixed wireless access services, low band services, mid band services, and/or high band services.

7. The method of claim 1, further comprising amplifiers to boost a reflected signal in power density.

8. The method of claim 1, further comprising requiring no electrical power to operate the A-VARA panel.

9. A method of utilizing an adaptable Van Atta reflective array (A-VARA) panel, the method comprising:
   mounting the A-VARA panel comprising variable phase shifters incorporated into transmission lines linking a set of radiating elements; and
   aligning a reference direction of the A-VARA panel using a scope or a planning tool to steer reflected coverage around an obstacle.

10. The method of claim 9, further comprising modifying a reflection direction of the A-VARA panel utilizing a control that provides an aggregate adjustment to each of the variable phase shifters to steer reflected coverage around an obstacle.

11. The method of claim 9, wherein the A-VARA system is utilized for single band operation or multi-band operation.

12. The method of claim 9, wherein the control comprises a first adjustment knob for single band operation and a second adjustment knob for multi-band operation.

13. The method of claim 9, wherein the A-VARA system provides fixed wireless access services, low band services, mid band services, and/or high band services.

14. The method of claim 9, further comprising amplifiers to boost a reflected signal in power density.

15. The method of claim 9, further comprising requiring no electrical power to operate the A-VARA panel.

16. An adaptable Van Atta reflective array (A-VARA) system, comprising:
   an A-VARA panel comprising variable phase shifters incorporated into transmission lines linking a set of radiating elements; and
   a control that modifies a reflection direction of the A-VARA panel and provides an aggregate adjustment to each of the variable phase shifters to steer reflected coverage around an obstacle.

17. The A-VARA system of claim 16, further comprising a scope to align a reference direction of the A-VARA panel.

18. The A-VARA system of claim 16, further comprising a planning tool to align a reference direction of the A-VARA panel.

19. The A-VARA system of claim 16, wherein the control comprises a first adjustment knob for single band operation and a second adjustment knob for multi-band operation.

20. The A-VARA system of claim 16, wherein the A-VARA system provides fixed wireless access services, low band services, mid band services, and/or high band services.

* * * * *